US012091982B2

(12) United States Patent
Cox et al.

(10) Patent No.: US 12,091,982 B2
(45) Date of Patent: Sep. 17, 2024

(54) TURBINE COMPONENT WITH HEATED STRUCTURE TO REDUCE THERMAL STRESS

(71) Applicant: General Electric Company, Schenectady, NY (US)

(72) Inventors: Brandon Lee Cox, Greenville, SC (US); Brad Wilson VanTassel, Greer, SC (US); Benjamin Paul Lacy, Greer, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 56 days.

(21) Appl. No.: 17/806,317

(22) Filed: Jun. 10, 2022

(65) Prior Publication Data

US 2023/0399959 A1 Dec. 14, 2023

(51) Int. Cl.

| | |
|---|---|
| ***F01D 9/06*** | (2006.01) |
| ***F01D 5/12*** | (2006.01) |
| ***F01D 25/08*** | (2006.01) |
| ***F01D 25/10*** | (2006.01) |

(52) U.S. Cl.

CPC ............... *F01D 25/08* (2013.01); *F01D 5/12* (2013.01); *F01D 9/065* (2013.01); *F01D 25/10* (2013.01); *F05D 2220/30* (2013.01); *F05D 2240/81* (2013.01); *F05D 2260/941* (2013.01)

(58) Field of Classification Search

CPC ... F01D 9/02; F01D 9/06; F01D 9/065; F01D 25/243; F01D 25/246; F01D 25/12

See application file for complete search history.

(56) References Cited

U.S. PATENT DOCUMENTS 5,098,257 A * 3/1992 Hultgren .................. F01D 5/18 415/116
5,494,402 A 2/1996 Glezer et al.
6,394,749 B2 5/2002 Yu et al.
(Continued)

FOREIGN PATENT DOCUMENTS

EP 3098391 A2 11/2016

OTHER PUBLICATIONS

European Search Report for corresponding EP Application No. 23174476.4-1004/4290052 dated Mar. 4, 2024, 9 pages.

*Primary Examiner* — Justin D Seabe
(74) *Attorney, Agent, or Firm* — Charlotte Wilson; James Pemrick; Hoffman Warnick LLC

(57) ABSTRACT

A turbine component includes a first structure exposed to a hot gas path and a second structure integral with the first structure but isolated from the hot gas path. A first fluid passage in the first structure delivers a thermal transfer fluid, e.g., air, through the first structure to cool the first structure. A second fluid passage is defined within the second structure and is in fluid communication with the first fluid passage. After heat transfer in the first structure, the thermal transfer fluid is hotter than a temperature of the second structure and thus increases the temperature of the second structure. The heat transfer to the second structure reduces a temperature difference between the first structure and the second structure that would, without heating, cause thermal stress between the structures. The heating of the second structure reduces the need for early maintenance and lengthens the lifespan of the component.

12 Claims, 10 Drawing Sheets

(56) References Cited

U.S. PATENT DOCUMENTS

| | | | | |
|---|---|---|---|---|
| 6,572,335 | B2 * | 6/2003 | Kuwabara | F01D 5/187<br>416/96 A |
| 6,761,529 | B2 * | 7/2004 | Soechting | F01D 9/041<br>415/115 |
| RE39,479 | E | 1/2007 | Tressler et al. | |
| 9,644,485 | B2 * | 5/2017 | Otomo | F01D 5/18 |
| 9,869,200 | B2 | 1/2018 | Jones et al. | |
| 9,988,916 | B2 * | 6/2018 | Winn | F01D 9/02 |
| 9,995,172 | B2 * | 6/2018 | Dutta | F01D 25/12 |
| 10,392,950 | B2 * | 8/2019 | Correia | F01D 9/04 |
| 10,550,721 | B2 * | 2/2020 | Hafner | F01D 9/041 |
| 11,492,914 | B1 * | 11/2022 | Quach | F01D 11/122 |
| 11,560,802 | B2 * | 1/2023 | Otomo | F01D 25/12 |
| 2012/0257954 | A1 * | 10/2012 | Chanteloup | F01D 5/187<br>415/115 |
| 2021/0310360 | A1 | 10/2021 | Otomo et al. | |

* cited by examiner

TURBINE COMPONENT WITH HEATED STRUCTURE TO REDUCE THERMAL STRESS

TECHNICAL FIELD

The disclosure relates generally to turbomachines and, more particularly, to a turbine component including fluid passages in a structure thereof configured to increase a temperature of the structure and reduce temperature differences that result in thermal stress.

BACKGROUND

Temperature differences between parts of a turbine component can cause thermal stress in the component. The thermal stress can cause earlier than expected maintenance and/or shorten the useful life of the component. Turbine components are cooled to prevent damage from a hot gas path of the turbine, but conventional cooling schemes do not mitigate the thermal stress experienced by components of the turbomachine caused by temperature differences.

BRIEF DESCRIPTION

All aspects, examples, and features mentioned below can be combined in any technically possible way.

An aspect of the disclosure includes a turbine component having a first structure exposed to a hot gas path and a second structure integral with the first structure but isolated from the hot gas path. A first fluid passage in the first structure delivers a thermal transfer fluid, e.g., a coolant such as air, through at least a portion of the first structure to cool the first structure. A second fluid passage is defined within at least a portion of the second structure and is in fluid communication with the first fluid passage. After heat transfer in the first structure, the thermal transfer fluid is hotter than a temperature of the second structure and thus increases the temperature of the second structure. The heat transfer to the second structure reduces a temperature difference between the first structure and the second structure that would, without heating, cause thermal stress between the structures. The heating of the second structure reduces the need for early maintenance and lengthens the lifespan of the component.

An aspect of the disclosure provides a turbine component, comprising: a first structure integrally coupled to a second structure; a first fluid passage defined in the first structure for delivering a first thermal transfer fluid through at least a portion of the first structure; and a second fluid passage defined within at least a portion of the second structure, the second fluid passage in fluid communication with the first fluid passage downstream of the first structure, wherein the first structure includes at least one surface thereof directly exposed to a hot gas path of a turbine, and the second structure is not directly exposed to the hot gas path of the turbine, and wherein a temperature of the first thermal transfer fluid entering the first structure in the first fluid passage is less than a temperature of the first structure to reduce the temperature of the first structure, and the temperature of the first thermal transfer fluid entering the second structure in the second fluid passage is greater than a temperature of the second structure to increase the temperature of the second structure.

Another aspect of the disclosure includes any of the preceding aspects, and the first structure includes at least one of an airfoil, a platform coupled to the airfoil and a slash face of the platform, and wherein the second structure includes a radially extending mounting rail coupled to the platform.

Another aspect of the disclosure includes any of the preceding aspects, and further comprising a third structure integrally coupled to the second structure and a third fluid passage defined within at least a portion of the third structure, wherein the third fluid passage is in fluid communication with the second fluid passage downstream of the second structure, and wherein the first thermal transfer fluid is used to at least one of: cool the third structure and function as a purge gas exiting the third structure.

Another aspect of the disclosure includes any of the preceding aspects, and the first structure includes at least one of an airfoil, a platform coupled to the airfoil and a slash face of the platform, wherein the second structure includes at least part of a radially extending mounting rail coupled to the platform, and wherein the third structure includes at least one of a slash face of the platform, an exterior surface of the airfoil and a trailing edge of the airfoil.

Another aspect of the disclosure includes any of the preceding aspects, and the second fluid passage has a non-linear path through the second structure.

Another aspect of the disclosure includes any of the preceding aspects, and the second fluid passage includes a plurality of fluid passages fluidly coupled by an upstream manifold at an upstream end thereof and fluidly coupled by a downstream manifold at a downstream end thereof.

Another aspect of the disclosure includes any of the preceding aspects, and further comprising a third structure integrally coupled to the second structure and in closer proximity to the hot gas path than the second structure; a third fluid passage defined in the third structure for delivering a second thermal transfer fluid through at least a portion of the third structure; and a fourth fluid passage defined within at least a portion of the second structure, the fourth fluid passage in fluid communication with the third fluid passage downstream of the third structure, wherein a temperature of the second thermal transfer fluid entering the third structure in the third fluid passage is less than a temperature of the third structure to reduce the temperature of the third structure, and the temperature of the second thermal transfer fluid entering the second structure in the fourth fluid passage is greater than a temperature of the second structure to increase the temperature of the second structure.

Another aspect of the disclosure includes any of the preceding aspects, and the first thermal transfer fluid in the second fluid passage in the second structure flows in a first direction in the second structure compared to a second, opposite direction of flow of the second thermal transfer fluid in the fourth fluid passage in the second structure.

An aspect of the disclosure also includes a turbine nozzle, comprising: an airfoil; a platform coupled to the airfoil, the platform including a radially extending mounting rail; a first fluid passage defined in at least one of the airfoil and the platform for delivering a first thermal transfer fluid therethrough; and a second fluid passage extending within at least a portion of a circumferential length of the radially extending mounting rail, the second fluid passage in fluid communication with the first fluid passage.

Another aspect of the disclosure includes any of the preceding aspects, and the airfoil and at least one surface of the platform are directly exposed to a hot gas path of a turbine, and the radially extending mounting rail is not directly exposed to the hot gas path of the turbine, and wherein a temperature of the first thermal transfer fluid entering the first fluid passage in the one of the airfoil and the platform is less than a temperature of the one of the airfoil and the platform to reduce the temperature of the one of the airfoil and the platform, and the temperature of the first thermal transfer fluid entering the second fluid passage in the radially extending mounting rail is greater than a temperature of the radially extending mounting rail to increase the temperature of the radially extending mounting rail.

Another aspect of the disclosure includes any of the preceding aspects, and further comprising an additional structure integrally coupled to the radially extending mounting rail and in closer proximity to the hot gas path than the radially extending mounting rail; and a third fluid passage defined within at least a portion of the additional structure, wherein the third fluid passage is in fluid communication with the second fluid passage downstream of the radially extending mounting rail, wherein the first thermal transfer fluid is used to at least one of: cool the additional structure and function as a purge gas exiting the additional structure.

Another aspect of the disclosure includes any of the preceding aspects, and the additional structure includes at least one of a slash face of the platform, an exterior surface of the airfoil, and a trailing edge of the airfoil.

Another aspect of the disclosure includes any of the preceding aspects, and further comprising: a fourth fluid passage defined in the additional structure for delivering a second thermal transfer fluid through at least a portion of the additional structure; and a fifth fluid passage defined within at least a portion of the radially extending mounting rail, the fifth fluid passage in fluid communication with the fourth fluid passage downstream of the additional structure, wherein a temperature of the second thermal transfer fluid entering the additional structure in the fourth fluid passage is less than a temperature of the additional structure to reduce the temperature of the additional structure, and the temperature of the second thermal transfer fluid entering the radially extending mounting rail in the fifth fluid passage is greater than a temperature of the radially extending mounting rail to increase the temperature of the radially extending mounting rail, and wherein the first thermal transfer fluid in the second fluid passage in the radially extending mounting rail flows in a first direction in the radially extending mounting rail compared to a second, opposite direction of flow of the second thermal transfer fluid in the fifth fluid passage in the radially extending mounting rail.

Another aspect of the disclosure includes any of the preceding aspects, and the second fluid passage has a non-linear path through the radially extending mounting rail.

Another aspect of the disclosure includes any of the preceding aspects, and the second fluid passage includes a plurality of fluid passages fluidly coupled by an upstream manifold at an upstream end thereof and fluidly coupled by a downstream manifold at a downstream end thereof.

An aspect of the disclosure relates to a method of reducing thermal stress in a turbine component of a turbine, the method comprising: in a turbine component of a turbine: decreasing a temperature of a first structure of the turbine component by passing a first thermal transfer fluid having a temperature lower than the first structure through a first fluid passage defined in the first structure; and increasing a temperature of a second structure of the turbine component that is integrally coupled to the first structure by passing the first thermal transfer fluid through a second fluid passage defined in the second structure after passing the first thermal transfer fluid through the first fluid passage in the first structure, wherein at least part of the first structure is directly exposed to a hot gas path (HGP) of the turbine, and the second structure is not exposed to the HGP of the turbine.

Another aspect of the disclosure includes any of the preceding aspects, and further comprising passing the first thermal transfer fluid through a third structure of the turbine component that is integrally coupled to the second structure after passing the first thermal transfer fluid through the second fluid passage in the second structure, wherein the first thermal transfer fluid is passed through a third fluid passage defined in the third structure to at least one of: cool the third structure and be discharged to an area exterior of the third structure as a purge gas.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
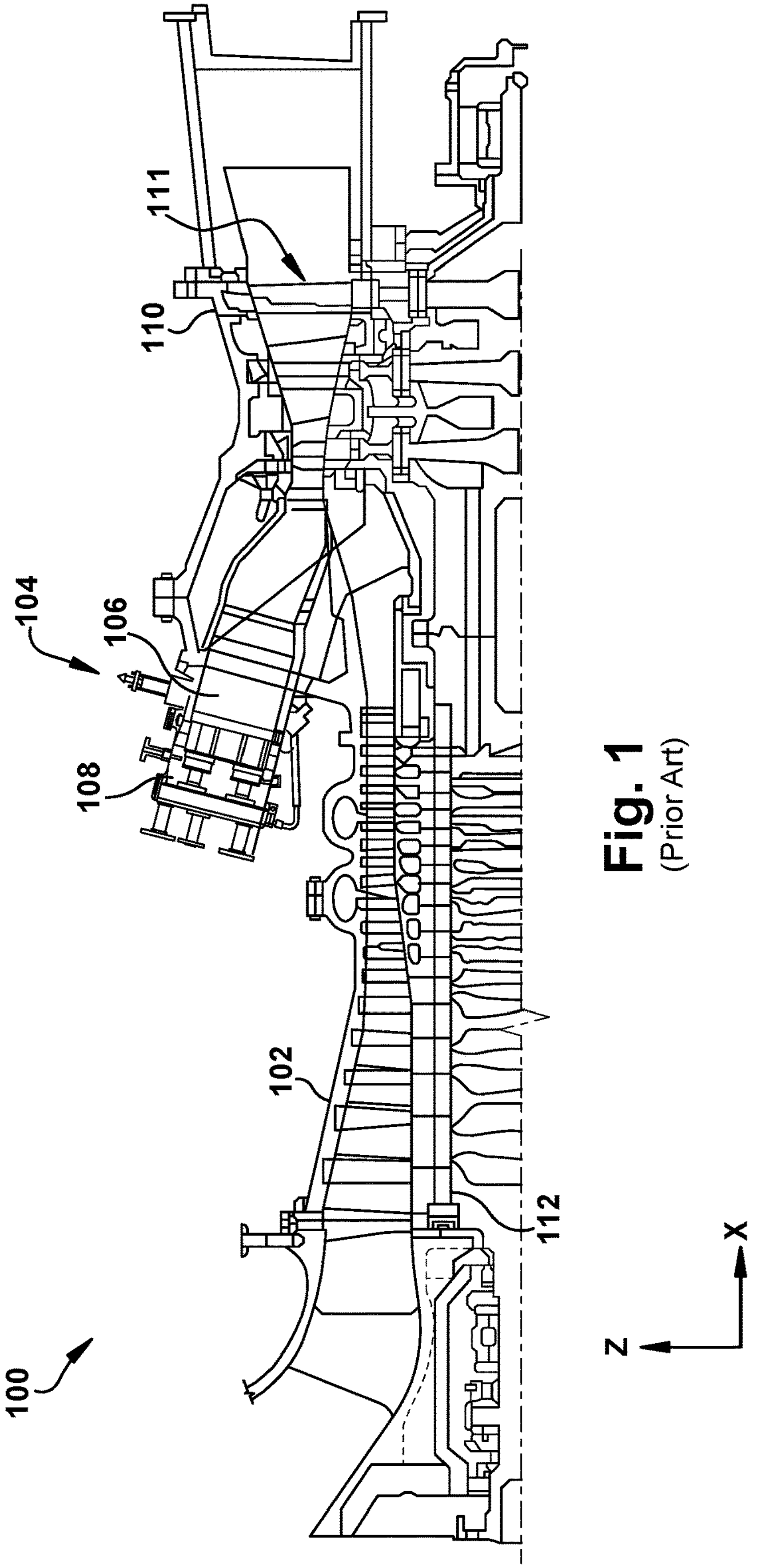
Fig. 1 (Prior Art)
FIG. 1 shows a schematic view of an illustrative turbomachine in the form of a gas turbine system.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the coolant through components of the turbine engine. The term "downstream" corresponds to the direction of flow of the fluid, and the term "upstream" refers to the direction opposite to the flow (i.e., the direction from which the flow originates). The terms "forward" and "aft," without any further specificity, refer to directions, with "forward" referring to the front or compressor end of the engine, and "aft" referring to the rearward section of the turbomachine.

It is often required to describe parts that are disposed at different radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine or to a centerline axis of a component, such as a turbine nozzle.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," an, and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently described component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, no intervening elements or layers are present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides a turbine component including a first structure or part integrally coupled to a second structure or part thereof. A first fluid passage is defined in the first structure for delivering a first thermal transfer fluid, e.g., a coolant such as air, through at least a portion of the first structure. A second fluid passage is defined within at least a portion of the second structure. The second fluid passage is in fluid communication with the first fluid passage downstream of the first structure. A temperature of the first thermal transfer fluid entering the first structure in the first fluid passage is less than a temperature of the first structure to reduce the temperature of the first structure. After heat transfer in the first structure, the heat transfer fluid is hotter such that the temperature of the first thermal transfer fluid entering the second structure in the second fluid passage is greater than a temperature of the second structure to increase the temperature of the second structure.

The heat transfer to the second structure reduces a temperature difference between the second structure and the first structure that would, without heating, cause thermal stress between the structures. In certain embodiments, the turbine component includes a nozzle, the first structure includes a platform of the nozzle, and the second structure includes a mounting rail of the nozzle. The thermal stress can cause bowing of the mounting rail, but with heating of the mounting rail as provided herein, the bowing is eliminated or greatly reduced. The heating of the mounting rail reduces temperature differences and thermal stress, reducing the need for maintenance and lengthening the lifespan of the component.

FIG. 1 shows a schematic view of an illustrative turbomachine 100. Some of the turbine components of turbomachine 100 may include fluid passages according to teachings of the disclosure. In the example, turbomachine 100 is in the form of a combustion or gas turbine system. Turbomachine 100 includes a compressor 102 and a combustor 104. Combustor 104 includes a combustion region 106 and a fuel nozzle assembly 108. Turbomachine 100 also includes a turbine assembly 110 and a common compressor/turbine shaft 112 (hereinafter referred to as a rotor 112).

In one embodiment, turbomachine 100 may be any HA or F model gas turbine (GT) system, commercially available from General Electric Company, Greenville, S.C. The present disclosure is not limited to any one particular GT system and may be implemented in connection with other engines including, for example, the other B, LM, GT, TM and E-class engine models of General Electric Company, and engine models of other companies. The present disclosure is not limited to any particular turbine or turbomachine, and may be applicable to, for example, steam turbines, jet engines, compressors, turbofans, etc. Furthermore, the present disclosure is not limited to any particular component and may be applied to any form of turbine component requiring reduction of thermal stress caused by temperature differences within structures of the component.

Continuing with FIG. 1, air flows through compressor 102 and compressed air is supplied to combustor 104. Specifically, the compressed air is supplied to fuel nozzle assembly 108 that is integral to combustor 104. Fuel nozzle assembly 108 is in flow communication with a fuel source and channels fuel and air to combustion region 106. Combustor 104 ignites and combusts fuel.

Combustor 104 is in flow communication with turbine assembly 110 within which gas stream thermal energy is converted to mechanical rotational energy. Turbine assembly 110 includes a turbine 111 that rotatably couples to and drives rotor 112. Compressor 102 also is rotatably coupled to rotor 112. In the illustrative embodiment, there are a plurality of combustors in combustion region 106 (e.g., within a circumferential array) and a plurality of fuel nozzle assemblies 108.

Figure 2:
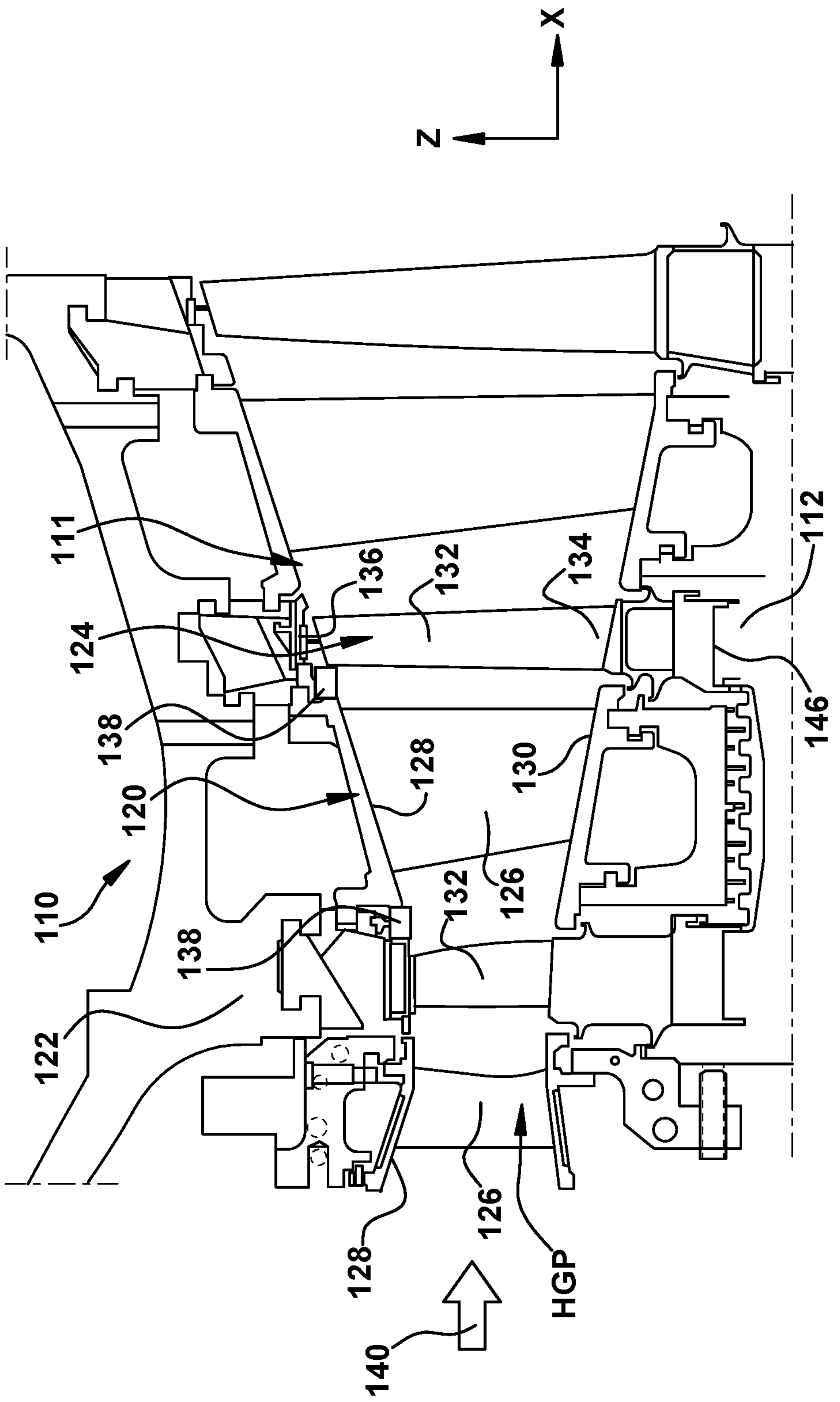
Fig. 2 (Prior Art)
FIG. 2 shows a cross-sectional view of an illustrative gas turbine assembly that may be used with the gas turbine system in FIG. 1.
Figure 5:
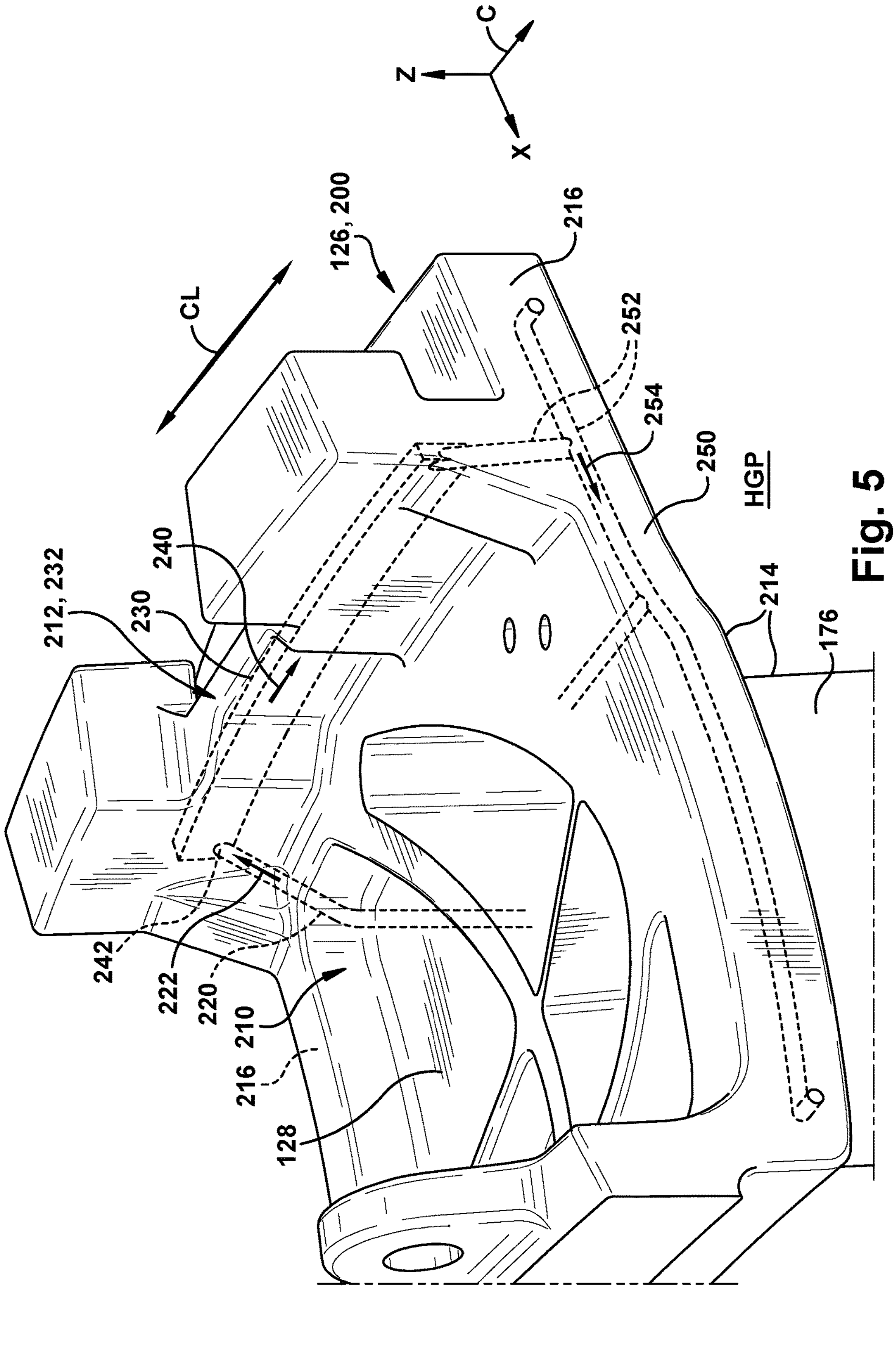
FIG. 5 shows a partially transparent perspective view of an illustrative turbine component in the form of a nozzle including a heating fluid passage, according to embodiments of the disclosure.

FIG. 2 shows a cross-sectional view of a part of an illustrative turbine assembly 110 of turbomachine 100 (FIG. 1). Turbine 111 of turbine assembly 110 includes a row or stage of nozzles 120 coupled to a stationary casing 122 of turbomachine 100 and axially adjacent a row or stage of rotating blades 124. A stationary nozzle 126 (also known as a vane) may be held in turbine assembly 110 by a radially outer platform 128 and a radially inner platform 130. Platforms 128, 130 may also be referred to as endwalls. As will be described herein, radially outer platform 128 includes a radially extending mounting rail 232 (FIG. 5). Each stage of blades 124 in turbine assembly 110 includes rotating blades 132 coupled to rotor 112 and rotating with the rotor. Rotating blades 132 may include a radially inner platform 134 (at a root of the blade) coupled to rotor 112 and a radially outer tip 136 (at a tip of the blade). Shrouds 138 may separate adjacent stages of nozzles 126 and rotating blades 132.

A working fluid 140, including for example combustion gases in the example gas turbine, passes through turbine 111 along what is referred to as a hot gas path (hereafter "HGP"). The HGP can be any area of turbine 111 exposed to combustion gases having hot temperatures. Various components of turbine 111 are exposed directly or indirectly to the HGP and may comprise a "turbine component." In the example turbine 111, nozzles 126 and shrouds 138 are all examples of turbine components that may benefit from the teachings of the disclosure. It will be recognized that other parts of turbine 111 exposed directly or indirectly to the HGP may also be considered turbine components capable of benefiting from the teachings of the disclosure.

Figure 3:
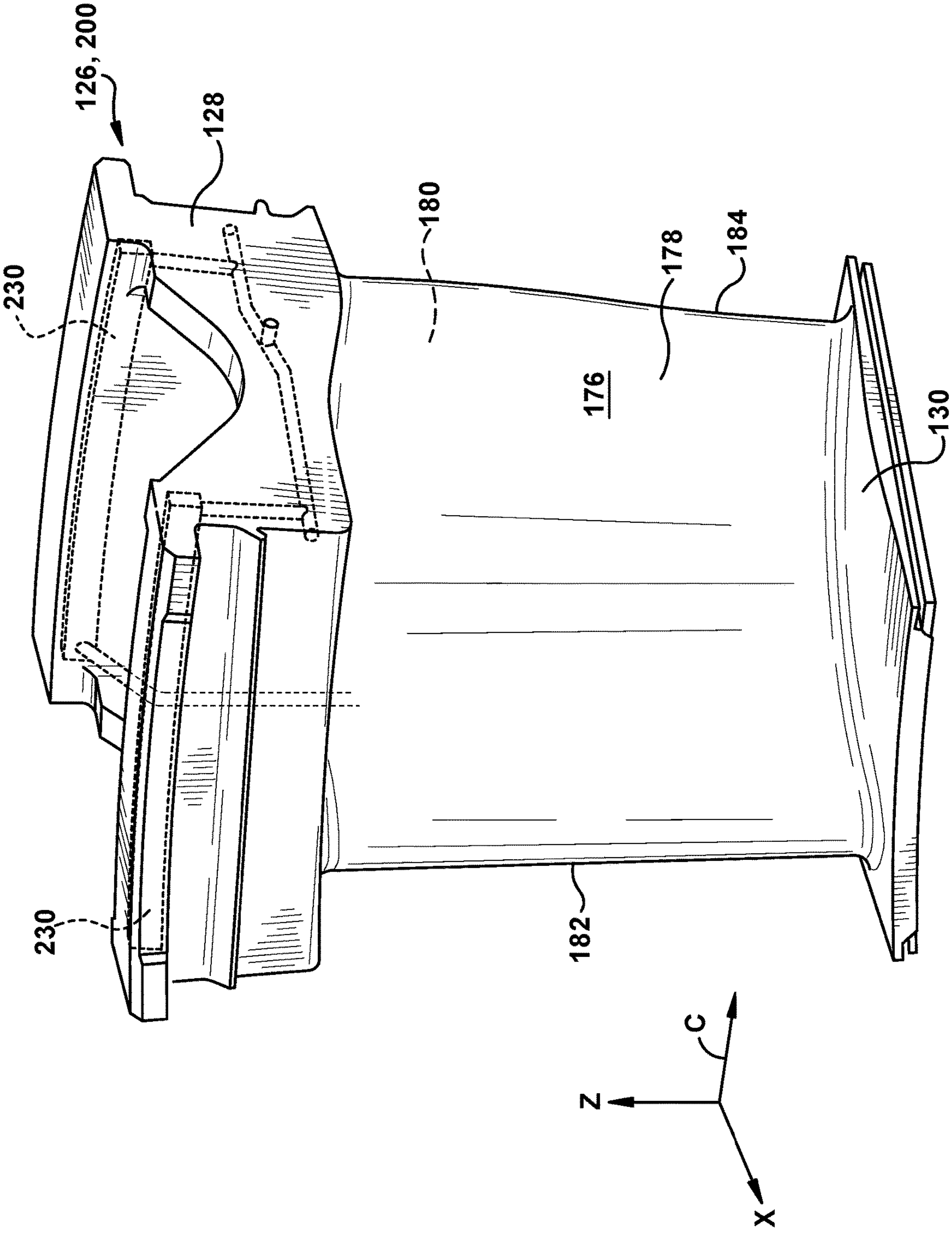
FIG. 3 shows a perspective view of a turbine component in the form of a nozzle, according to embodiments of the disclosure.
Figure 4:
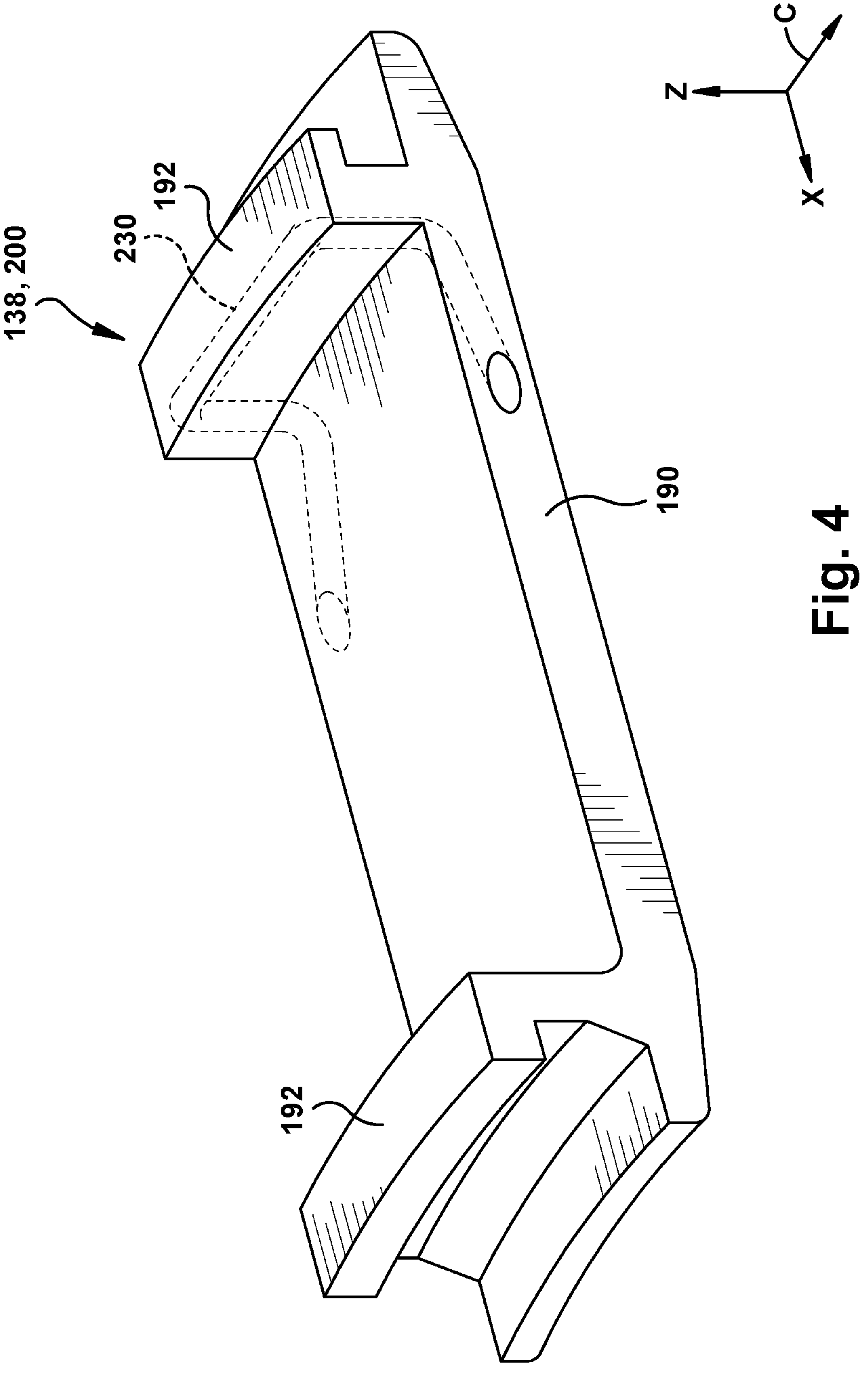
FIG. 4 shows a perspective view of a turbine component in the form of a shroud, according to embodiments of the disclosure.

FIGS. 3-4 show perspective views of examples a turbine component 200 in which teachings of the disclosure may be employed.

FIG. 3 shows a perspective view of a turbine component 200 in the form of a stationary nozzle 126. Nozzle 126 includes radial outer platform 128 by which nozzle 126 attaches to stationary casing 122 (FIG. 2) of the turbomachine. Outer platform 128 may include any now known or later developed mounting configuration for mounting in a corresponding mount in casing 122 (FIG. 2). Nozzle 126 may further include radially inner platform 130 for positioning between platforms 134 of adjacent turbine rotating blades 132 (FIG. 2). Platforms 128, 130 define respective portions of the outboard and inboard boundary of the HGP through turbine assembly 110, and hence are directly exposed to the HGP.

It will be appreciated that airfoil 176 is the active component of nozzle 126 that intercepts the flow of working fluid and directs it towards turbine rotating blades 132 (FIG. 2). Airfoil 176 is thus also directly exposed to the HGP. It will be seen that airfoil 176 of nozzle 126 includes a concave pressure side (PS) outer wall 178 and a circumferentially or laterally opposite convex suction side (SS) outer wall 180 extending axially between opposite leading and trailing edges 182, 184, respectively. Walls 178 and 180 also extend in the radial direction from platform 130 to platform 128. Fluid passages according to embodiments of the disclosure can be used, for example, within platforms 128, 130 or other parts of nozzle 126. With respect to nozzle 126, the circumferential direction is indicated by the arrow labeled "C", the axial direction by the arrow labeled "X", and the radial direction by the arrow labeled "Z", where such directions are relative to a gas turbine centerline (i.e., through rotor 112).

FIG. 4 shows a perspective view of turbine component 200 in the form of a shroud 138. Shroud 138 may include a platform 190 for positioning between tips 136 (FIG. 2) of turbine rotating blades 132 (FIG. 2) and radially outer platforms 128 (FIGS. 2-3) of nozzles 126 (FIGS. 2-3). Shroud 138 may be fastened to casing 122 (FIG. 2) in any fashion. Fluid passages according to embodiments of the disclosure can be used, for example, within a mounting rail 192 or other parts of shroud 138. With respect to shroud 138, the circumferential direction is indicated by the arrow labeled "C", the axial direction by the arrow labeled "X", and the radial direction by the arrow labeled "Z", where such directions are relative to a gas turbine centerline (i.e., through rotor 112).

Referring collectively to FIGS. 3-4, as noted, embodiments of the disclosure described herein may be applied to any turbine component 200 of turbine 111 (FIG. 2), such as but not limited to nozzles 126 (FIG. 3) and/or shrouds 138 (FIG. 4). It will be recognized that the turbine components 200 oftentimes include one or more structures having fluid passages (oftentimes as part of larger cooling circuits) to deliver a coolant to structures or parts thereof exposed to the HGP of turbine 111 to cool those parts. In contrast to conventional cooling circuits, embodiments of the disclosure implement a fluid passage(s), e.g., passage 230 (FIG. 5), that heats a structure or part of turbine component 200 to reduce a temperature difference between structures and to reduce thermal stress in turbine component 200.

Referring to FIGS. 5-9, for purposes of description, the fluid passages according to embodiments of the disclosure will be illustrated and described relative to nozzle 126 and, more particularly, a radially outer platform 128 of nozzle 126. In certain embodiments, nozzle 126 may be a first stage nozzle, i.e., the left-most stage in FIG. 2, but it could be located at any stage. It is emphasized that the teachings of the disclosure may be applied to any turbine component 200 having two integral structures that observe different temperatures that cause thermal stress.

FIG. 5 shows a partially transparent perspective view of turbine component 200 in the form of nozzle 126 including a heating fluid passage 230, according to embodiments of the disclosure. As shown in FIG. 5, turbine component 200 in the form of nozzle 126 includes a first structure or part 210 integrally coupled to a second structure or part 212. First structure 210 may include at least one surface 214 directly exposed to the HGP of turbine 111 (FIG. 2), or in any event, exposed to a heat source in a manner that has a hotter temperature and/or requires cooling of the structure. In the nozzle 126 example, first structure 210 may include at least one of airfoil 176, platform 128 coupled to airfoil 176 and a slash face 216 of platform 128. A slash face 216 is a surface of platform 128 that faces a similar surface of an adjacent nozzle 126.

In the nozzle 126 example, second structure 212 may include a radially extending mounting rail 232 that is integral with platform 128. Radially extending mounting rail 232 (hereinafter "mounting rail 232") may include any now known or later developed structure to couple nozzle 126 to casing 122 (FIG. 2). Mounting rail 232 may also be referred to as a hook because of its hook or L-shaped cross-section. Second structure 212 is not directly exposed to the HGP of turbine 111 (FIG. 2) or, in any event, is not reliant on cooling for operation. Hence, second structure 212 is cooler in temperature than, for example, first structure 210. The temperature difference between first and second structures 210, 212 of turbine component 200 can create thermal stress between the structures. In some situations, mounting rail 232 may bow radially outward, creating stress in platform 128, for example, where it meets a radially outer end of airfoil 176 at leading and/or trailing edge 182, 184 (FIG. 3) of the airfoil. Temperature differences between structures 210, 212 in other turbine components 200 can create similar thermal stress.

A first (cooling) fluid passage 220 is defined in first structure 210 for delivering a first thermal transfer fluid 222 through at least a portion of first structure 210. "Thermal transfer fluid" may include any form of fluid capable of heat transfer, such as air from compressor 102 (FIG. 1) or another source. As recognized, first thermal transfer fluid 222 may enter first structure 210 in any number of locations. Further, first thermal transfer fluid 222 may pass through portion(s) of first structure 210 to cool those portion(s) in a large variety of ways. For example, first thermal transfer fluid 222 may pass through portions of airfoil 176 in cooling passages or through impingement sleeves, and/or pass through portions of platform 128 or slash faces 216 in cooling passages defined therein. In the nozzle 126 example in FIG. 5, first fluid passage 220 may be in at least one of airfoil 176 and platform 128 for delivering first thermal transfer fluid 222 therethrough. For purposes of description, first fluid passage 220 is shown mainly within platform 128, but it could be in any portion of nozzle 126 that has a hotter temperature and/or that requires cooling. In any event, a temperature of first thermal transfer fluid 222 entering first structure 210 in first fluid passage 220 is less than a temperature of first structure 210. Hence, first thermal transfer fluid 222 in first structure 210 reduces the temperature of first structure 210. While one first fluid passage 220 is illustrated, any number of first fluid passages 220 may be present and feed to second fluid passage(s) 230.

Turbine component 200 also includes a second (heating) fluid passage 230 defined within at least a portion of second structure 212. Second fluid passage 230 is in fluid communication with first fluid passage 220 downstream of first structure 210 so that first thermal transfer fluid 222 flows into second fluid passage 230. In the nozzle 126 example, second fluid passage 230 extends within at least a portion of a circumferential length (see arrow CL) of radially extending mounting rail 232. That is, it extends within at least part of radially extending mounting rail 232 coupled to platform 128. In second structure 212, first thermal transfer fluid (now labeled 240) includes the same form of fluid as in first structure 210, e.g., such as air from compressor 102 (FIG. 1) or another source, but has a temperature greater than first thermal transfer fluid 222 when it initially entered first structure 210. That is, first thermal transfer fluid 240 has picked up heat from first structure 210 via conduction, so that it is hotter than first thermal transfer fluid 222 that initially enters first structure 210. In this manner, a temperature of first thermal transfer fluid 240 entering second structure 212 in second fluid passage 230 is greater than a temperature of second structure 212 to increase the temperature of second structure 212. The increasing of the temperature of second structure 212 reduces the temperature difference between structures 210, 212, and reduces the thermal stress between them. In one non-limiting example, first thermal transfer fluid 240 in second structure 212 may be 90-150° C. hotter than first thermal transfer fluid 222 in first structure 210.

Turbine component 200 may also include a third structure 250 integrally coupled to second structure 212 and a third fluid passage 252 defined within at least a portion of third structure 250. Third fluid passage 252 is in fluid communication with second fluid passage 230 downstream of second structure 212. In the nozzle 126 example, third structure 250 may include a slash face 216 (nearest viewer in FIG. 5) of platform 128, but it could include a wide variety of parts of nozzle 126 requiring cooling by thermal transfer fluid and/or requiring purge using the thermal transfer fluid to reduce gas ingestion between parts. For example, third structure 250 may include at least one of slash face 216 of platform 128, an exterior surface of airfoil 176, and/or trailing edge 184 (FIG. 3) of airfoil 176. Third structure 250 is disposed in closer proximity to the hot gas path than second structure 212.

In third structure 250, first thermal transfer fluid (now labeled 254) includes the same form of fluid as in first and second structures 210, 212, e.g., such as air from compressor 102 (FIG. 1) or another source, but has a temperature lower than first thermal transfer fluid 240 when it initially entered second structure 212. First thermal transfer fluid 254 in third structure 250 may be used, for example, to cool third structure 250 (after its temperature is reduced within second structure 212) and/or as purge gas out of third structure 250 to prevent ingestion of gases into turbine component 200. When used for cooling, first thermal transfer fluid 254 may pass to any other downstream structure for additional cooling or other use, e.g., additional cooling or purge gas. When used for purge gas, first thermal transfer fluid 254 may pass out of third structure 250 in any desired location.

With further regard to second fluid passage 230, the passage can be positioned in any desired location to heat second structure 212 and may be arranged to allow first thermal transfer fluid 240 to enter second structure 212 in any number of locations, e.g., depending on the shape of second structure 212. In the nozzle 126 example shown, second fluid passage 230 has an inlet 242 near a circumferential end of mounting rail 232.

Figure 6:
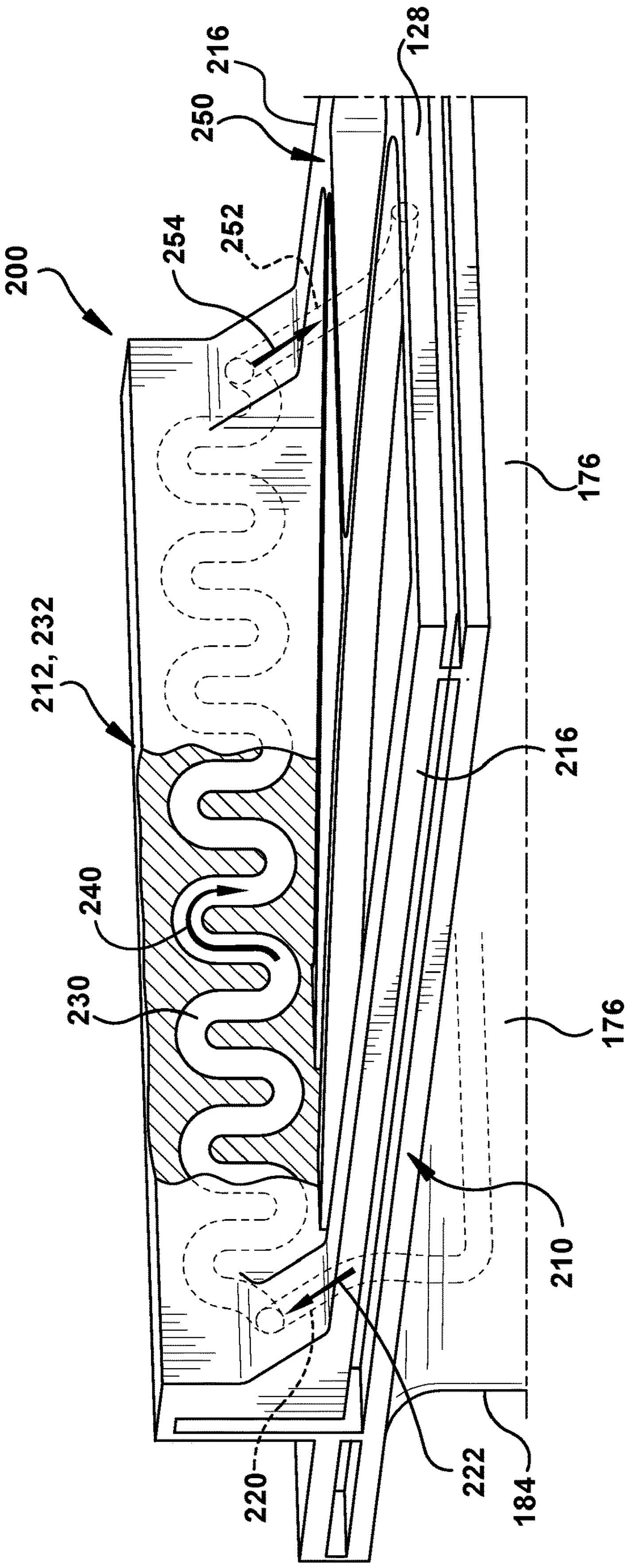
FIG. 6 shows a partially transparent perspective view of a turbine component in the form of a nozzle including a heating fluid passage, according to other embodiments of the disclosure.
Figure 7:
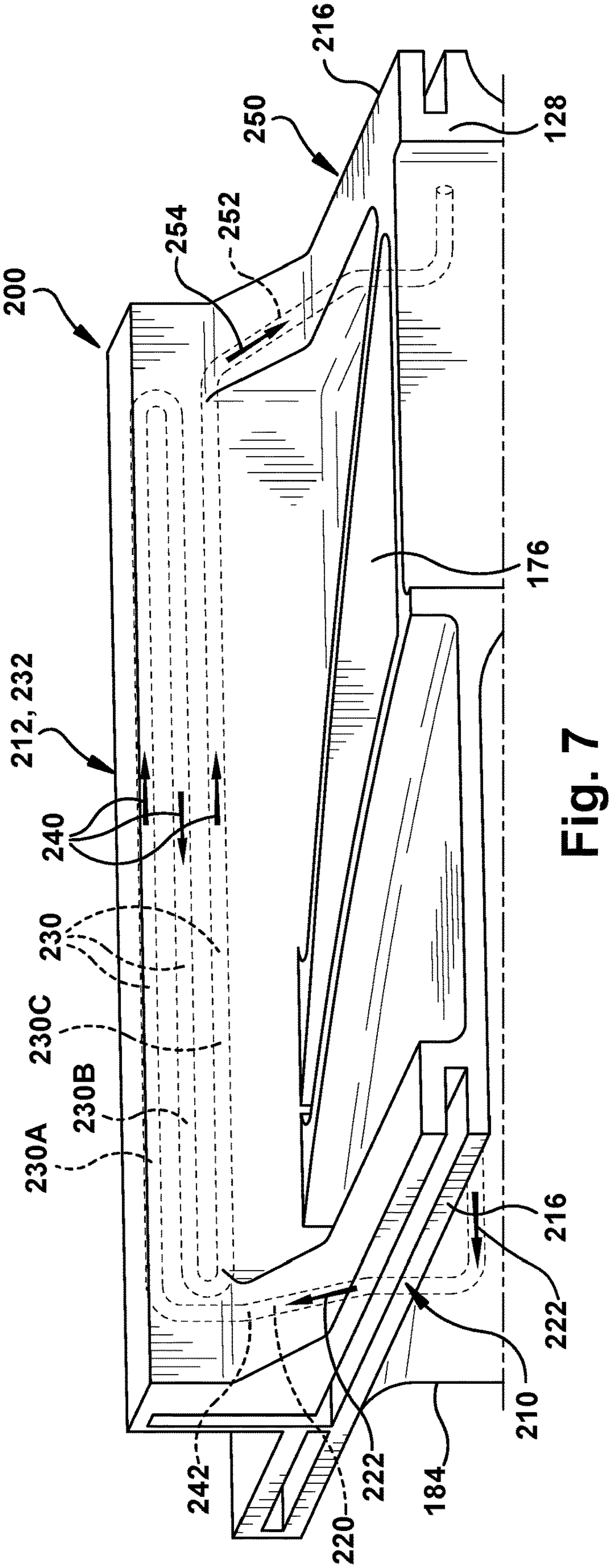
FIG. 7 shows a partially transparent perspective view of a turbine component in the form of a nozzle including a heating fluid passage, according to embodiments of the disclosure.

First thermal transfer fluid 240 may pass through portion(s) of second structure 212 to heat those portion(s) in a large variety of ways. That is, second fluid passage 230 can take a large variety of forms to ensure heat transfer to second structure 212, e.g., mounting rail 232. In FIG. 5, second fluid passage 230 has a linear path through mounting rail 232. FIG. 6 shows a partially transparent perspective view of turbine component 200 in which second structure 212 is also in the form of mounting rail 232. In FIG. 6, second fluid passage 230 has a non-linear path through second structure 212. While shown as a serpentine path, second fluid passage 230 may have any form of non-linear path, e.g., curved, sinusoidal in a length-wise direction (rather than radially as in FIG. 5), among many other options. FIG. 7 shows a partially transparent perspective view of turbine component 200 in which second fluid passage 230 is sinusoidal in a lengthwise direction within mounting rail 232. A cross-sectional shape of second fluid passage 230 can be any desired shape to foster heat transfer. In certain embodiments, as shown in FIG. 6, second fluid passage 230 can be circular in cross-section. In certain embodiments, second fluid passage 230 may have a non-circular cross-section, e.g., oval or otherwise oblong, polygonal (FIGS. 5, 7 and 8), or other shapes.

Figure 8:
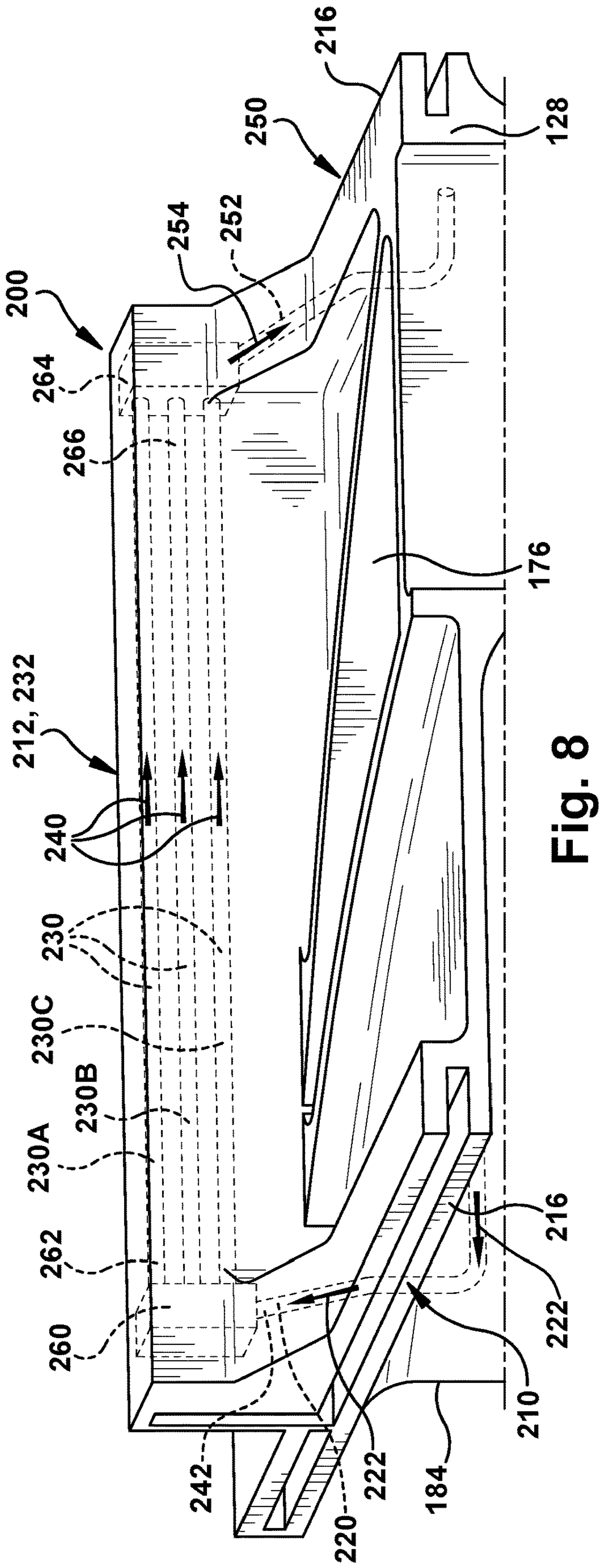
FIG. 8 shows a partially transparent perspective view of a turbine component in the form of a nozzle including a heating fluid passage, according to other embodiments of the disclosure.

Second fluid passage 230 may also be segmented to include a plurality of fluid passages. For example, FIG. 8 shows three passages 230A-C. Any number of passages 230 can be used. Where a plurality of fluid passages 230A-C is used, they may be fluidly coupled by an upstream manifold 260 at an upstream end 262 thereof and fluidly coupled by a downstream manifold 264 at a downstream end 266 thereof. Upstream manifold 260 may be fluidly coupled at inlet 242 to first fluid passage 220 in first structure 210, and downstream manifold 264 may be fluidly coupled to third fluid passage 252 in third structure 250.

Figure 9:
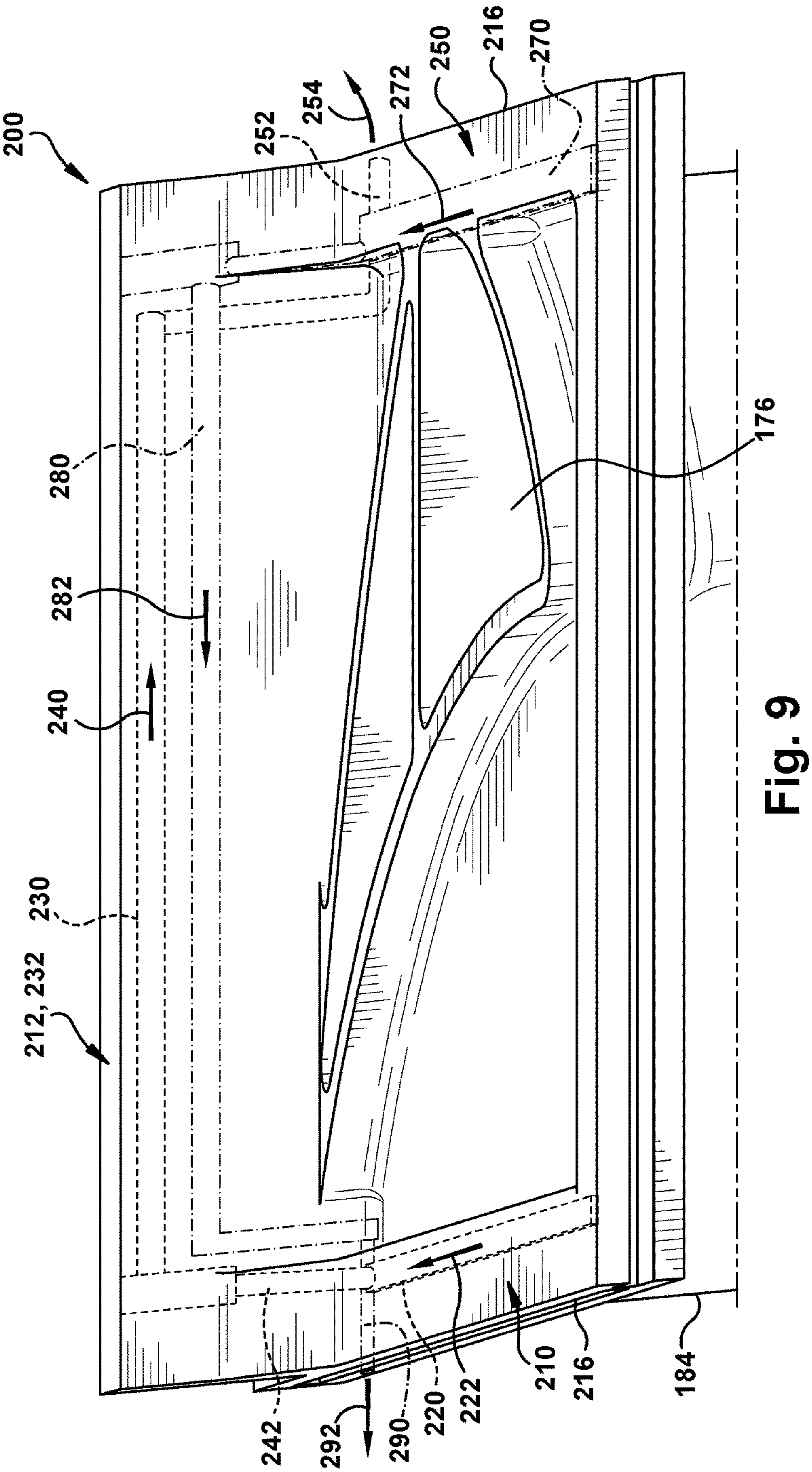
FIG. 9 shows a partially transparent perspective view of a turbine component in the form of a nozzle including two different heating fluid passages, according to additional embodiments of the disclosure.
Figure 11:
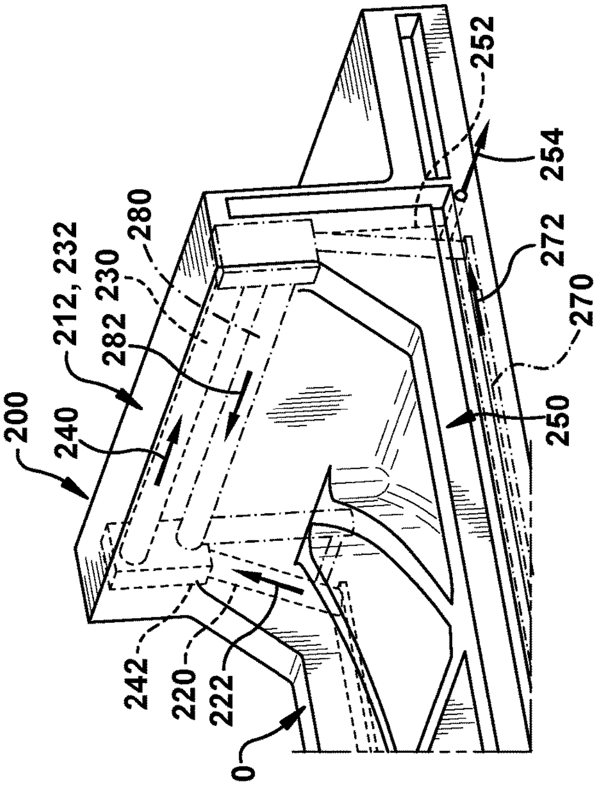
FIG. 11 shows an enlarged, partially transparent perspective view of a corner of a turbine component in the form of a nozzle including two different heating fluid passages, according to additional embodiments of the disclosure.
Figure 10:
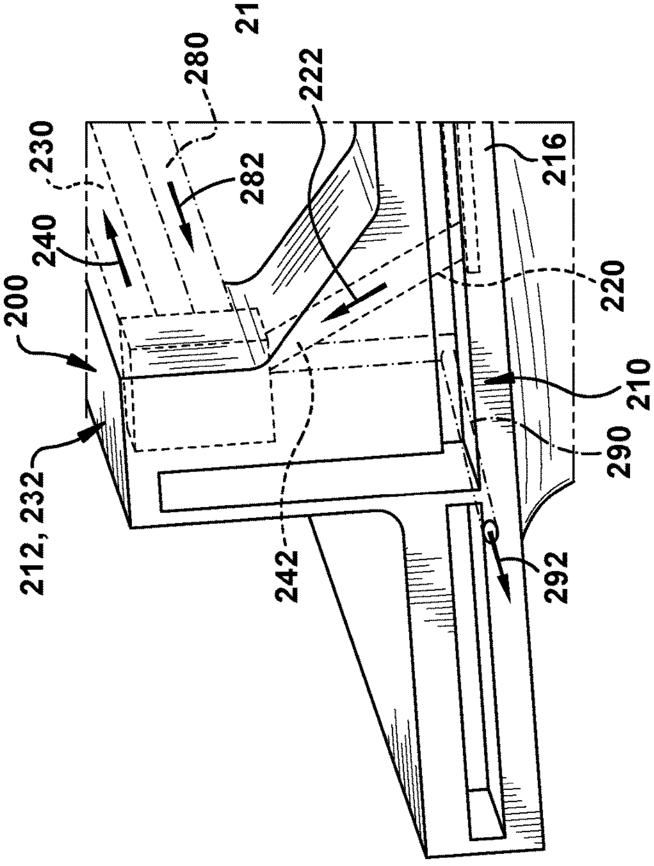
FIG. 10 shows an enlarged, partially transparent perspective view of a corner of a turbine component in the form of a nozzle including two different heating fluid passages, according to additional embodiments of the disclosure.

Referring to FIGS. 9-11, in another embodiment, two different heating fluid passages 230, 280 may be provided through second structure 212, e.g., mounting rail 232. FIG. 9 shows a partially transparent perspective view of turbine component 200 in the form of nozzle 126 including two different heating fluid passages 230, 280; FIG. 10 shows an enlarged, transparent perspective view of a corner (near first structure 210) of turbine component 200; and FIG. 11 shows an enlarged, transparent perspective view of a corner (near third structure 250) of turbine component 200. As previously described, second fluid passage(s) 230 extends through second structure 212 and is in fluid communication with first fluid passage 220 in first structure 210 at one end thereof and with third fluid passage 252 in third structure 250 at another end thereof.

In the FIGS. 9-11 embodiments, another fluid passage 270 is defined in third structure 250 for delivering a second thermal transfer fluid 272 through at least a portion of third structure 250. Second thermal transfer fluid 272 may include any form of fluid capable of heat transfer, such as air from compressor 102 (FIG. 1) or another source. As recognized, second thermal transfer fluid 272 may enter third structure 250 in any number of locations. Further, second thermal transfer fluid 272 may pass through portion(s) of third structure 250 to cool those portion(s) in a large variety of ways. For example, second thermal transfer fluid 272 may pass through portions of airfoil 176 in cooling passages or through impingement sleeves, and/or pass-through portions of platform 128 or slash faces 216 in cooling passages defined therein.

In the example in FIGS. 9 and 11 of nozzle 126, fluid passage 270 may be in at least one of airfoil 176 and platform 128 for delivering second thermal transfer fluid 272 therethrough. For purposes of description, fluid passage 270 is shown mainly within platform 128, but it could be in any portion of nozzle 126 that has a hotter temperature and/or that requires cooling. In any event, a temperature of second thermal transfer fluid 272 entering third structure 250 in fluid passage 270 is less than a temperature of third structure 250. Hence, second thermal transfer fluid 272 in third structure 250 reduces the temperature of third structure 250. While one fluid passage 270 is illustrated, any number of fluid passages 270 may be present and feed to fluid passage(s) 280 in second structure 212.

Figure 12:
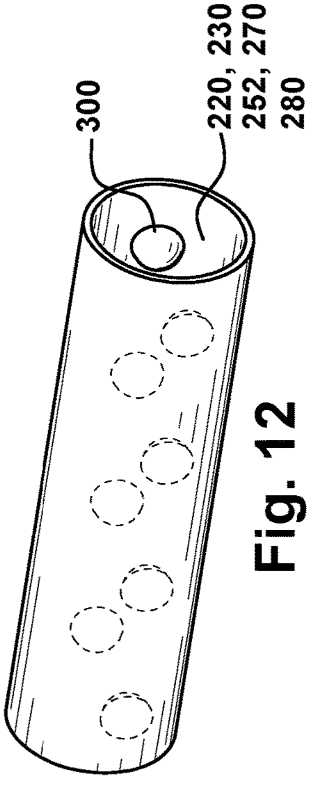
FIG. 12 shows a schematic perspective view of a heating fluid passage including heat transfer enhancements, according to other embodiments of the disclosure.

In FIGS. 9-11, another fluid passage 280 is defined within at least a portion of second structure 212. Fluid passage 280 is in fluid communication with fluid passage 270 downstream of third structure 250. Fluid passage 280 in second structure 212 can take any form described herein relative to second fluid passage(s) 230, e.g., in terms of number, plenums, linear or non-linear path (e.g., curved or sinusoidal), shape, heat transfer enhancers (FIG. 12), etc. As noted, a temperature of second thermal transfer fluid 272 entering third structure 250 in fluid passage 270 is less than a temperature of third structure 250 to reduce the temperature of third structure 250. The temperature of second thermal transfer fluid (now labeled 282) entering second structure 212 in fluid passage 280 is greater than a temperature of second structure 212 to increase the temperature of second structure 212. As shown in FIGS. 9-11, first thermal transfer fluid 240 in second fluid passage(s) 230 in second structure 212 flows in a first direction in second structure 212 while second thermal transfer fluid 282 in fluid passage(s) 280 in second structure 212 flows in a second, opposite direction.

Once through fluid passage 280 in second structure 212, second thermal transfer fluid (now labeled 292) may be used to cool first structure 210 and/or may be purged through first structure 210 through another fluid passage 290 therein. Fluid passage 290 is in fluid communication with fluid passage 280 downstream of second structure 212. In first structure 210, second thermal transfer fluid 292 includes the same form of fluid as in structures 212, 250, e.g., air from compressor 102 (FIG. 1) or another source, but has a temperature lower than second thermal transfer fluid 282 when it initially entered second structure 212. Second thermal transfer fluid 292 in first structure 210 may be used, for example, to cool first structure 210 and/or as purge gas to prevent ingestion of gases into turbine component 200 (similarly to the description of thermal transfer fluid 254 in third structure 250). While one fluid passage 290 is illustrated, any number of fluid passages 290 may be present to cool first structure 210 and/or to purge gas from first structure 210.

Fluid passage(s) provided herein can have any cross-sectional shape described herein, individually or collectively. Where multiple fluid passages are used in any structure 210, 212, 250 (e.g., fluid passages 230A-C (FIGS. 7-8) or fluid passage(s) 280 in second structure 212), they can have any cross-sectional shape described herein, individually or collectively. As shown in a schematic perspective view in FIG. 12, any fluid passage(s) provided herein may also include at least one heat transfer enhancement structure 300 therein. Heat transfer enhancement structures 300 can take any form to enhance heat transfer, such as, but not limited to, protrusions, teeth, undulations, etc.

As shown in FIGS. 3 and 5-8, embodiments of the disclosure also include turbine nozzle 126. Nozzle 126 may include airfoil 176, and platform 128 coupled to airfoil 176. Platform 128 may also include radially extending mounting rail 232. First fluid passage 220 is defined in at least one of airfoil 176 and platform 128 for delivering first thermal transfer fluid 222, e.g., air, therethrough. Second fluid passage 230 is defined within at least a portion of a circumferential length (arrow CL in FIG. 5) of radially extending mounting rail 232, and second fluid passage 230 is in fluid communication with first fluid passage 220.

Airfoil 176 and at least one surface 214 of platform 128 (e.g., a radially inwardly facing surface 214 or slash face(s) 216) are directly exposed to the HGP of turbine 111 (FIG. 2). Radially extending mounting rail 232 is not directly exposed to the HGP of turbine 111 (FIG. 2). A temperature of first thermal transfer fluid 220 entering first fluid passage 220 in airfoil 176 or platform 128 is less than a temperature of airfoil 176 or platform 128 to reduce the temperature of airfoil 176 or platform 128. In contrast, the temperature of first thermal transfer fluid 240 entering second fluid passage 230 in radially extending mounting rail 232 is greater than a temperature of radially extending mounting rail 232 to increase the temperature of mounting rail 232. The heating of mounting rail 232 reduces the temperature difference between it and structure(s) integral to it, e.g., airfoil 176 and platform 128. The reduced temperature difference reduces thermal stress between the parts, e.g., where trailing edge 184 of airfoil 176 meets platform 128 radially inward of mounting rail 232. Second fluid passage 230 may have any number, path, cross-sectional shape, and/or arrangement, as described herein.

Nozzle 126 may also include a downstream structure 250 (previously referred to as 'third structure' or later referred to as 'additional structure') integrally coupled to mounting rail 232 and including third fluid passage 252 defined within at least a portion thereof. Downstream structure 250 may include any other part of nozzle 126, such as but not limited to at least one of: slash face 216 of platform 128, an exterior surface of airfoil 176 and trailing edge 184 (FIGS. 3, 5, 7 and 8, see dashed passage in FIG. 5) of airfoil 176. Third fluid passage 252 is in fluid communication with second fluid passage 230 downstream of mounting rail 232. First thermal transfer fluid 254 entering third fluid passage 252 in downstream structure 250 may be used for cooling downstream structure 250 and/or as purge gas to prevent gas ingestion in the noted parts.

Nozzle 126 may also include the structure described relative to FIGS. 9-11. In these embodiments, fluid passage 270 is defined in downstream structure 250 for delivering a second thermal transfer fluid 272 through at least a portion of downstream structure 252 (where "downstream" is relative to the flow of thermal transfer fluid 272 through the fluid passage 230). Further, fluid passage 280 is defined within at least a portion of radially extending mounting rail 232. Fluid passage 280 is in fluid communication with fluid passage 270 downstream of downstream structure 250 (that is, fluid passage 270 being upstream in a flow direction from fluid passage 280 based on flow through fluid passages 270, 280). As described, temperature of second thermal transfer fluid 272 entering downstream structure 250 in fluid passage 270 is less than a temperature of downstream structure 250 to reduce the temperature of downstream structure 250. Also, the temperature of second thermal transfer fluid 282 entering radially extending mounting rail 232 in fluid passage 280 is greater than a temperature of radially extending mounting rail 232 to increase the temperature of mounting rail 232. As shown in FIG. 9, first thermal transfer fluid 240 in second fluid passage(s) 230 in mounting rail 232 flows in a first direction in mounting rail 232 compared to a second, opposite direction of flow of second thermal transfer fluid 282 in fluid passage(s) 280 in mounting rail 232.

Figure 13:
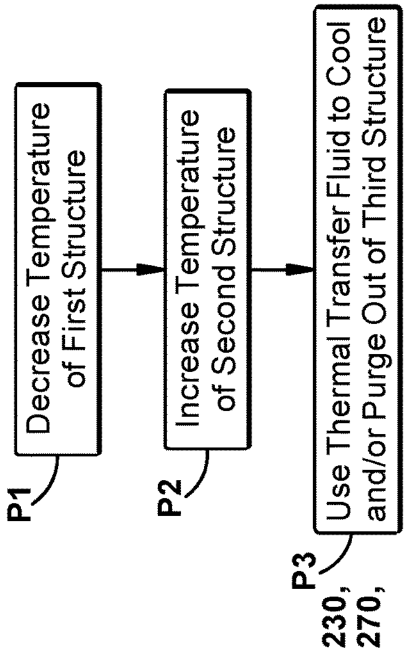
FIG. 13 shows a flow diagram of a method of reducing thermal stress in a turbine component of a turbine, according to embodiments of the disclosure.

Referring to the flow diagram of FIG. 13, a method of reducing thermal stress in a turbine component of a turbine, according to embodiments of the disclosure, will now be described. In turbine component 200 of turbine 111, a method may include, in process P1, decreasing a temperature of first structure 210 of turbine component 200 by passing (cooler) first thermal transfer fluid 222 having a temperature lower than first structure 210 through a first fluid passage 220 defined in first structure 210. The method may also include, in process P2, increasing a temperature of second structure 212 of turbine component 200 that is integrally coupled to first structure 210 by passing (heated) first thermal transfer fluid 240 through the first fluid passage 220 in the first structure 210 through a second fluid passage 230 defined in the second structure 212. At least part of first structure 210 may be directly exposed to the HGP of turbine 111 (FIG. 2), and second structure 212 may not be exposed to the HGP of turbine 111 (FIG. 2).

In process P3, the method may include using first thermal transfer fluid 254 in third structure 250 of turbine component 200 that is integrally coupled to second structure 212 as a coolant and/or a purge gas. Here, the process may include using first thermal transfer fluid 254 to cool third (downstream) structure 250 (passing it through third structure 250) and/or using first thermal transfer fluid 254 as a purge gas by having it exit out of third structure 250 of turbine component 200. Third structure 250 is integrally coupled to second structure 212 such that first thermal transfer fluid 240 passes from second fluid passage 230 in second structure 212 through a third fluid passage 252 defined in third structure 250 as first thermal transfer fluid 254 to cool third structure 250 and/or to exit to an area exterior of third structure 250. That is, first thermal transfer fluid 254 may be used to cool third structure 250 and/or as a passing (purging) gas out of third structure 250. It will be recognized that the flow of FIG. 13 is also applicable to fluid passages 270, 280, 290 in the FIGS. 9-11 embodiments. In this case, the order of structures that second thermal transfer fluid 272, 282, 292 passes through is reversed, i.e., third structures 250, second structure 212 and then first structure 210.

Embodiments of the disclosure include heating structure that may be implemented in a turbine component in a turbine to influence and mitigate thermal stresses experienced throughout the component. Heating the structure(s) includes positioning heating fluid passage(s) through selected structures of the turbine component to balance the thermal load in the component and therefore improve component life. The heating arrangement takes used coolant (e.g., spent air) from component cooling circuits and passes it through the target structure to raise its bulk temperature. The methods described herein can be used to increase part life and cycle capability by focusing on cold-side mechanics.

The foregoing drawings show some of the processing associated according to several embodiments of this disclosure. In this regard, each process within the flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. A turbine component, comprising:

a first structure including an airfoil and a platform coupled to the airfoil;

a second structure including a radially extending mounting rail coupled to the platform;

a first fluid passage defined in the first structure for delivering a first thermal transfer fluid through at least a portion of the first structure; and a second fluid passage defined within at least a portion of a circumferential length of the radially extending mounting rail, the second fluid passage in fluid communication with the first fluid passage downstream of the first structure, wherein the first structure includes at least one surface thereof directly exposed to a hot gas path of a turbine, and the second structure is not directly exposed to the hot gas path of the turbine, wherein a temperature of the first thermal transfer fluid entering the first structure in the first fluid passage is less than a temperature of the first structure to reduce the temperature of the first structure, and the temperature of the first thermal transfer fluid entering the second structure in the second fluid passage is greater than a temperature of the second structure to increase the temperature of the second structure, and wherein the second fluid passage includes a portion separated from the platform in a radial direction.

2. The turbine component of claim 1, further comprising a third structure integrally coupled to the second structure and a third fluid passage defined within at least a portion of the third structure, wherein the third fluid passage is in fluid communication with the second fluid passage downstream of the second structure, and wherein the first thermal transfer fluid is used to at least one of: cool the third structure and function as a purge gas exiting the third structure.

3. The turbine component of claim 2, wherein the third structure includes at least one of a slash face of the platform, an exterior surface of the airfoil, or a trailing edge of the airfoil.

4. The turbine component of claim 1, wherein the second fluid passage has a non-linear path through the second structure.

5. The turbine component of claim 1, wherein the second fluid passage includes a plurality of fluid passages fluidly coupled by an upstream manifold at an upstream end thereof and fluidly coupled by a downstream manifold at a downstream end thereof.

6. The turbine component of claim 1, further comprising:

a third structure integrally coupled to the second structure and in closer proximity to the hot gas path than the second structure;

a third fluid passage defined in the third structure for delivering a second thermal transfer fluid through at least a portion of the third structure; and a fourth fluid passage defined within at least a portion of the second structure, the fourth fluid passage in fluid communication with the third fluid passage downstream of the third structure, wherein a temperature of the second thermal transfer fluid entering the third structure in the third fluid passage is less than a temperature of the third structure to reduce the temperature of the third structure, and the temperature of the second thermal transfer fluid entering the second structure in the fourth fluid passage is greater than a temperature of the second structure to increase the temperature of the second structure.

7. The turbine component of claim 6, wherein the first thermal transfer fluid in the second fluid passage in the second structure flows in a first direction in the second structure compared to a second, opposite direction of flow of the second thermal transfer fluid in the fourth fluid passage in the second structure.

8. The turbine component of claim 1, further comprising a third structure integrally coupled to the radially extending mounting rail and in closer proximity to the hot gas path than the radially extending mounting rail; and a third fluid passage defined within at least a portion of the third structure, wherein the third fluid passage is in fluid communication with the second fluid passage downstream of the radially extending mounting rail, wherein the first thermal transfer fluid is used to at least one of: cool the third structure and function as a purge gas exiting the third structure.

9. The turbine component of claim 8, further comprising:

a fourth fluid passage defined in the third structure for delivering a second thermal transfer fluid through at least a portion of the third structure; and a fifth fluid passage defined within at least a portion of the radially extending mounting rail, the fifth fluid passage in fluid communication with the fourth fluid passage downstream of the third structure, wherein a temperature of the second thermal transfer fluid entering the third structure in the fourth fluid passage is less than a temperature of the third structure to reduce the temperature of the third structure, and the temperature of the second thermal transfer fluid entering the radially extending mounting rail in the fifth fluid passage is greater than a temperature of the radially extending mounting rail to increase the temperature of the radially extending mounting rail, and wherein the first thermal transfer fluid in the second fluid passage in the radially extending mounting rail flows in a first direction in the radially extending mounting rail compared to a second, opposite direction of flow of the second thermal transfer fluid in the fifth fluid passage in the radially extending mounting rail.

10. The turbine component of claim 8, wherein the third structure includes at least one of a slash face of the platform, an exterior surface of the airfoil, or a trailing edge of the airfoil.

11. A method of reducing thermal stress in a turbine component of a turbine, the method comprising:

in a turbine component of a turbine:

decreasing a temperature of a first structure of the turbine component by passing a first thermal transfer fluid having a temperature lower than the first structure through a first fluid passage defined in the first structure, wherein the first structure includes an airfoil and a platform coupled to the airfoil; and increasing a temperature of a second structure of the turbine component that includes a radially extending mounting rail coupled to the platform by passing the first thermal transfer fluid through a second fluid passage defined in at least a portion of a circumferential length of the radially extending mounting rail after passing the first thermal transfer fluid through the first fluid passage in the first structure, wherein at least part of the first structure is directly exposed to a hot gas path (HGP) of the turbine, and the second structure is not exposed to the HGP of the turbine, and wherein the second fluid passage includes a portion separated from the platform in a radial direction.

12. The method of claim 11, further comprising passing the first thermal transfer fluid through a third structure of the turbine component that is integrally coupled to the second structure after passing the first thermal transfer fluid through the second fluid passage in the second structure, wherein the first thermal transfer fluid is passed through a third fluid passage defined in the third structure to at least one of: cool the third structure and be discharged to an area exterior of the third structure as a purge gas.

* * * * *